United States Patent Office 2,850,519
Patented Sept. 2, 1958

2,850,519

PROCESS FOR THE PRODUCTION OF α-MONO-CYANETHYLATED KETONES

Heinrich Krimm, Krefeld-Bockum, Germany, assignor to Farbenfabriken Bayer Aktiengesellschaft, Leverkusen, Germany, a corporation of Germany No Drawing. Application October 8, 1956
Serial No. 614,385

Claims priority, application Germany October 13, 1955

15 Claims. (Cl. 260—464)

It is known to react ketones with acrylic acid nitrile in the presence of strongly alkaline catalysts such as alkali metal, alkali metal hydroxides, alkali metal cyanides, quaternary ammonium bases or cross-linked poly-quaternary ammonium bases, thus producing ketones cyanethylated in α-position to the carbonyl group.

The necessity of using strongly basic catalysts is a great drawback since side-reactions, for example aldol condensation of ketones, can scarcely be avoided. The reactions are, moreover, strongly exothermic, thus necessitating special precautions for removing the reaction heat when the reactions are carried out on a technical scale.

A special feature of the known processes is, furthermore, the fact that it is generally not possible, when using ketones containing several equally activated hydrogen atoms in α-position to the carbonyl group, to obtain monocyanethylated ketones in substantial quantities. Even when using an excess of ketone there are preferably formed in these cases higher cyanethylated compounds and not the monocyanethylated compounds. Since the monocyanethylated ketones are frequently of special technical interest, the hitherto known processes of cyanethylating ketones are not suitable for their production.

It has now been found that it is possible to obtain with advantage preferentially monocyanethylated ketones in α-position to the carbonyl group by reacting ketones having several equally activated hydrogen atoms in α-position, with acrylonitrile by carrying out the reaction in the presence of primary amines as catalysts in a pH-range of 5–12.

Suitable catalysts are preferably primary amines or a mixture of a primary amine and an acid or a salt of such an amine. Instead of primary amines, compounds may also be used which yield primary amines by hydrolysis, such as Schiff's bases from primary amines and aldehydes or ketones.

It is essential that the amines serving as catalysts are employed in neither a definitely acidic nor strongly basic reaction medium, but within the aforesaid pH-range.

The action of the catalysts to be used according to the invention is surprising because the view has hitherto prevailed that the reaction of acrylic acid nitrile with compounds containing reactive hydrogen, particularly with ketones, could be accelerated to an appreciable degree only with the application of strongly basic catalysts at a pH of more than 12. It has now been found that also weakly basic catalysts, though surprisingly only primary amines, are capable of greatly promoting the reaction of acrylic acid nitrile with ketones within the above indicated pH-range. It should also be noted that with the aid of such catalysts the reaction may be conducted in such a manner that with ketones containing several equally activated hydrogen atoms monocyanethylated products are obtained as chief reaction product.

Of the ketones suitable for the reaction, the following may be mentioned, for example, aliphatic ketones such as acetone, methylethyl ketone, methylpropyl ketone, diethyl ketone, methyl-isopropyl ketone, methyl-isobutyl ketone, methyl-heptyl ketone, acetyl acetone or acetonyl acetone, cycloaliphatic ketones such as cyclopentanone, in particular cyclohexanone or 2- or 4-methylcyclohexanone, further 1- or 2-oxo-decahydronaphthalene, cyclohexanedione-(1,2) or cyclohexandione-(1,4) as well as mixed aliphatic-aromatic ketones such as acetophenone, propiophenone or 1- or 2-oxo-tetrahydronaphthalene.

Of the primary amines used as catalysts, the following may be mentioned, for example, aliphatic amines such as methylamine, ethylamine, n-propylamine, isopropylamine, n-butylamine, isobutylamine, secondary butylamine, tertiary butylamine, n-amylamine, isoamylamine, n-dodecylamine, ethylenediamine, tetramethylenediamine and hexamethylenediamine, cycloaliphatic amines such as cyclopentylamine, cyclohexylamine, hexahydrobenzylamine and 2- or 4-methylcyclohexylamine, aromatic amines such as benzylamine, aniline, o-, m-, p-toluidine, phenylenediamine and benzidine, amino acids such as glycocoll and ε-aminocaproic acid, and aminoalcohols such as aminoethanol and aminopropanol.

As acid additions there may be used for example, carboxylic acids such as formic acid, acetic acid, butyric acid, chloroacetic acids, benzoic acid, oxalic acid, succinic acid, adipic acid or phthalic acid, furthermore inorganic acids such as hydrochloric acid, sulphuric acid, phosphoric acid and carbonic acid.

The quantity of the catalyst to be added according to the invention is in general about 0.1–10 percent, preferably about 1–5 percent, referred to the total reaction mixture.

Although I prefer to use 1 mol of acrylic acid nitrile to 1 mol of the ketone, this ratio is not critical for the invention. Thus it is also possible to use less than 1 mol of acrylic acid nitrile to 1 mol of the ketone. When using an excess of the acrylic acid nitrile the monocyanethylated ketone is formed, but the amount of by-product dicyanethylated ketone as by-product increases.

According to the invention, for instance a mixture of equimolecular quantities of ketone and acrylic acid nitrile is heated with addition of the catalyst to the reaction temperature required, generally between about 50° and about 250° C. The most advantageous reaction temperature depends on the type of the ketone used and on the kind, quantity and pH-range of the catalyst. Cycloaliphatic ketones are especially easily converted; aliphatic ketones frequently require a prolonged reaction time or elevated temperatures. Especially slowly reacting ketones are therefore reacted in a pressure vessel. In each individual case, the best reaction conditions can easily be ascertained by preliminary experiments. Frequently, an excess of ketone is advantageously used, thus obtaining an especially high yield of monocyanethylated ketones.

After the reaction is completed, the cyanethylated ketones are in most cases obtained in a pure state by distillation of the reaction mixture under reduced pressure.

The reaction products are valuable intermediates for a great variety of organic synthesis. It is possible to obtain, for example, technically valuable ketocarboxylic acids by saponification of the cyanethyl groups. For instance by saponification of 2-(β-cyanethyl)-cyclohexanone one obtains 2-(β-carboxyethyl)-cyclohexanone, a material which may be used for manufacturing or modifying plastics. Further amines or amino alcohols suitable for producing plastics, as surface active agents and as auxiliaries in textile treating, may be obtained by hydrogenation of the cyanethylated ketones, and by hydrogenation in the presence of ammonia one obtains diamines, which are useful also for the production of plastics.

The following examples are given for the purpose of illustrating the invention.

Example 1

A mixture of 98 grams (1 mol) of cyclohexanone, 53 grams (1 mol) of acrylic acid nitrile, 5 grams of cyclohexylamine, 1 gram of glacial acetic acid and 0.1 gram of hydroquinone is boiled for 2 hours, the temperature rising thereby to 200° C. By distilling the reaction mixture in vacuo, there are obtained in addition to 9 grams of unreacted cyclohexanone, 122 grams (89 percent of the theoretical) of 2-($\beta$-cyanethyl)-cyclo-hexanone of boiling point 109–110° C. at a pressure of 0.8 mm. mercury gauge.

Example 2

A mixture of 147 grams (1.5 mol) of cyclohexanone, 53 grams (1 mol) of acrylic acid nitrile, 5 grams of cyclo-hexylamine, 1 gram of glacial acetic acid and 0.1 gram of hydroquinone is boiled for 2 hours, the temperature of the liquid rising thereby to 180° C. The mixture is then kept at this temperature for a further half hour and subsequently distilled in vacuo. Apart from 51 grams of unreacted cyclohexanone, there are obtained 135 grams of 2-($\beta$-cyanethyl)-cyclohexanone having a boiling point of 109–110° C. at a pressure of 0.8 mm. mercury gauge. The distillation residue is heated on a steam bath with dilute hydrochloric acid for a half hour, the separated oil is taken up in benzene, and the residue of the benzene solution is distilled in vacuo. It still contains 5 grams of 2-($\beta$-cyanethyl)-cyclohexanone. The total yield of the monocyanethylated product thus amounts to 95 percent of the theoretical.

Example 3

A mixture of 98 grams (1 mol) of cyclohexanone, 53 grams (1 mol) of acrylic acid nitrile, 2 grams of hexamethylenediamine, 2 grams of glacial acetic acid and 0.1 gram of hydroquinone is boiled for 8 hours until the temperature of the liquid has risen to 190° C. By distilling the reaction product in vacuo, there are obtained apart from 23 grams of unreacted cycylohexanone, 88 grams (76 percent of the theoretical) of 2-($\beta$-cyanethyl)-cyclohexanone.

Example 4

A mixture of 98 grams (1 mol) of cyclohexanone, 53 grams (1 mol) of acrylic acid nitrile, 5 grams of $\epsilon$-aminocaproic acid and 0.1 gram of hydroquinone is boiled for 2 hours until the temperature of the liquid has risen to 190° C. By distilling the reaction product in vacuo there are obtained apart from 10 grams of unreacted ketone, 106 grams of 2-($\beta$-cyanethyl)-cyclohexanone. Yield: 78 percent of the theoretical.

Example 5

A mixture of 84 grams (1 mol) of cyclopentanone, 26.5 grams (½ mol) of acrylic acid nitrile, 5 grams of cyclohexylamine, 1 gram of glacial acetic acid and 0.1 gram of hydroquinone is boiled for 2 hours until the temperature of the liquid has risen to 129° C. After distilling the unreacted cyclopentanone (47 grams), 2-($\beta$-cyanethyl)-cyclopantanone goes over at a boiling point of 98–105° C. at a pressure of 0.9 mm. mercury gauge. Yield: 44 grams = 73 percent of the theoretical.

Example 6

A mixture of 101 grams (⅔ mol) of 2-oxo-decahydronaphthalene, 35 grams (⅔ mol) of acrylic acid nitrile, 3.3 grams of cyclohexylamine, 0.7 gram of glacial acetic acid and 0.1 gram of hydroquinone is boiled for 30 hours until the temperature of the liquid has risen to 190° C. By distilling the reaction product in vacuo, there are obtained apart from 38 grams of the unreacted ketone, 55 grams (65 percent of the theoretical) of ($\beta$-cyanethyl)-2-oxo-decahydronaphthalene of boiling point 143–147° C. at a pressure of 0.9 mm. mercury gauge.

Example 7

A mixture of 86 grams (1 mol) of methylpropylketone, 53 grams (1 mol) of acrylic acid nitrile, 10 grams of cyclo-hexylamine, 2 grams of glacial acetic acid and 0.1 gram of hydroquinone is boiled for 50 hours, the temperature of the liquid rising thereby from 87° to 110° C. By distilling the reaction product, there are obtained apart from 62 grams of unreacted ketone, 24 grams (62 percent of the theoretical) of 3-($\beta$-cyanethyl)-pentanone-(2) having a boiling point of 85–92° C. at a pressure of 0.7 mm. mercury gauge.

Example 8

A mixture of 240 grams (2 mol) of acetophenone, 26.5 grams (½ mol) of acrylic acid nitrile, 10 grams of cyclohexylamine, 2 grams of glacial acetic acid and 0.1 gram of hydroquinone is boiled for 26 hours until the temperature of the liquid has risen to 180° C. After distillation of the unreacted acetophenone (206 grams) in vacuo, 37 grams of 4-benzoylbutyric acid nitriles are obtained boiling at 128–135° C. at a pressure of 0.7 mm. mercury gauge. Yield: 75.5 percent of the theoretical.

Example 9

A mixture of 98 grams (1 mol) of cyclohexanone, 53 grams (1 mol) of acrylic acid nitrile, 6 grams of cyclohexylamine, 0.5 gram of strong hydrochloric acid and 0.1 gram of hydroquinone is boiled for 18 hours until the temperature of the liquid has risen to 180° C. By distilling the reaction product in vacuo there are obtained apart from 15 grams of unreacted cyclohexanone 86 grams of 2-($\beta$-cyanethyl)-cyclohexanone. Yield: 67 percent of the theoretical.

Example 10

A mixture of 580 grams (10 mol) of acetone, 265 grams (5 mol) of acrylic acid nitrile, 25 grams of cyclohexylamine, 2 grams of benzoic acid and 0.5 gram of hydroquinone is boiled for 2 hours in the autoclave until the temperature of the liquid has risen to 200° C. By distillation of the reaction product there are obtained apart from 300 grams of unreacted acetone 360 grams of ($\beta$-cyanethyl)-acetone (4-oxo-caproic acid nitrile) of the boiling point of 95–105° C. at a pressure of 9 mm. mercury gauge. The fraction distilling at 175–200° C. at a pressure of 0.4 mm. mercury gauge (132 grams) consists of dicyanethylated products of acetone.

I claim:

1. The process for the production of $\alpha$-mono-cyanoethylated ketones which comprises reacting ketones containing several equally activated hydrogen atoms in $\alpha$-position with acrylic acid nitrile in the presence of a primary amine in a pH-range of 5–12, the amount of primary amine being 0.1–10% by weight of the total reaction mixture.

2. The process according to claim 1, wherein the amine is used with the addition of an acid.

3. The process according to claim 1, wherein the ketone is an aliphatic ketone.

4. The process according to claim 1, wherein the ketone is a cycloaliphatic ketone.

5. The process according to claim 1, wherein the ketone is a mixed aliphatic-aromatic ketone.

6. The process according to claim 1, wherein the primary amine is an aliphatic amine.

7. The process according to claim 1, wherein the primary amine is a cycloaliphatic amine.

8. The process according to claim 1, wherein the primary amine is an aromatic amine.

9. The process according to claim 1, wherein the primary amine is an amino acid.

10. The process according to claim 1, wherein the primary amine is an amino alcohol.

11. The process for the production of 2-(β-cyanoethyl)-cyclohexanone, which comprises boiling a mixture of cyclohexanone and acrylic acid nitrile in the presence of from 0.1–10% by weight of cyclohexylamine based on the total reaction mixture and at a pH of from 5–12 and distilling the reaction mixture in vacuo.

12. The process for the production of 2-(β-cyanoethyl)-cyclopentanone, which comprises boiling a mixture of cyclopentanone and acrylic acid nitrile in the presence of from 0.1–10% by weight of cyclohexylamine based on the total reaction mixture and at a pH of from 5–12 and distilling the reaction mixture in vacuo.

13. The process for the production of 3-(β-cyanoethyl)-pentanone-(2), which comprises boiling a mixture of methylpropyl ketone and acrylic acid nitrile in the presence of from 0.1–10% by weight of cyclohexylamine based on the total reaction mixture and at a pH of from 5–12 and distilling the reaction mixture in vacuo.

14. The process for the production of 4-benzoylbutyric acid nitrile, which comprises boiling a mixture of acetophenone and acrylic acid nitrile in the presence of from 0.1–10% by weight of cyclohexylamine based on the total reaction mixture and at a pH of from 5–12 and distilling the reaction mixture in vacuo.

15. The process for the production of (β-cyanoethyl)-acetone, which comprises boiling a mixture of acetone and acrylic acid nitrile in the presence of from 0.1–10% by weight of cyclohexylamine based on the total reaction mixture and at a pH of from 5–12 and distilling the reaction mixture in vacuo.

References Cited in the file of this patent

UNITED STATES PATENTS

| | | |
|---|---|---|
| 1,992,615 | Hoffmann et al. | Feb. 26, 1935 |
| 2,394,962 | Bruson | Feb. 12, 1946 |
| 2,403,570 | Wiest et al. | July 9, 1946 |
| 2,579,580 | Howk et al. | Dec. 25, 1951 |
| 2,773,087 | Stork | Dec. 4, 1956 |